US010124826B2

(12) United States Patent
She

(10) Patent No.: US 10,124,826 B2
(45) Date of Patent: *Nov. 13, 2018

(54) SYSTEM AND METHOD FOR ROBUST ACTIVE DISTURBANCE REJECTION IN ELECTRIC POWER STEERING

(71) Applicant: TRW Automotive U.S. LLC, Livonia, MI (US)

(72) Inventor: Yun She, Clawson, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/323,771

(22) PCT Filed: Jul. 9, 2015

(86) PCT No.: PCT/US2015/039674
§ 371 (c)(1),
(2) Date: Jan. 4, 2017

(87) PCT Pub. No.: WO2016/007705
PCT Pub. Date: Jan. 14, 2016

(65) Prior Publication Data
US 2017/0158228 A1    Jun. 8, 2017

Related U.S. Application Data

(60) Provisional application No. 62/022,694, filed on Jul. 10, 2014.

(51) Int. Cl.
*B62D 5/04*    (2006.01)
(52) U.S. Cl.
CPC ......... *B62D 5/0472* (2013.01); *B62D 5/0448* (2013.01); *B62D 5/0463* (2013.01)

(58) Field of Classification Search
CPC ...... B62D 5/04; B62D 5/0448; B62D 5/0463; B62D 5/0472
(Continued)

(56) References Cited

U.S. PATENT DOCUMENTS 6,370,459 B1 *   4/2002  Phillips ................ B62D 5/0436
                                             180/443
6,895,318 B1 *   5/2005  Barton .................. B60T 8/1755
                                             180/204

(Continued)

FOREIGN PATENT DOCUMENTS

JP    2003081122 A    3/2003
WO    2013151714 A1   10/2013

OTHER PUBLICATIONS

International Search Report, Application No. PCT/US2015/039674, dated Sep. 25, 2015.

(Continued)

*Primary Examiner* — Atul Trivedi
(74) *Attorney, Agent, or Firm* — MacMillan, Sobanski & Todd, LLC

(57) ABSTRACT

An electric motor of an electric power steering assembly is activated in response to a response signal. The response signal includes a baseline control torque signal generated by a baseline controller and an auxiliary control torque signal generated by a disturbance rejection controller. At least one operating parameter of the electric power steering assembly is estimated as a function of the baseline control torque signal. The at least one operating parameter is also measured. An error amount is determined as a function of the at least one measured operating parameter and the at least one estimated operating parameter. The disturbance rejection controller refines the at least one estimated operating param- (Continued)

eter as a function of the error amount. The auxiliary control torque signal is generated to minimize the error amount.

27 Claims, 10 Drawing Sheets

(58) Field of Classification Search
USPC .......................................................... 701/41
See application file for complete search history.

(56) References Cited

U.S. PATENT DOCUMENTS

| | | | |
|---|---|---|---|
| 8,219,285 B2 | 7/2012 | Watanabe et al. | |
| 9,771,103 B2 | 9/2017 | She et al. | |
| 2002/0005314 A1* | 1/2002 | Takehara | B62D 5/0463 180/443 |
| 2003/0074120 A1 | 4/2003 | Kleinau | |
| 2003/0200018 A1* | 10/2003 | Arimura | B62D 5/0457 701/41 |
| 2007/0205041 A1* | 9/2007 | Nishizaki | B62D 5/0472 180/446 |
| 2008/0147276 A1 | 6/2008 | Pattok et al. | |
| 2009/0200099 A1 | 8/2009 | Wong et al. | |
| 2009/0234538 A1* | 9/2009 | Ta | B62D 5/046 701/41 |
| 2009/0271075 A1 | 10/2009 | Hales et al. | |
| 2010/0211263 A1* | 8/2010 | Lindenstruth | B62D 5/0472 701/41 |
| 2010/0324784 A1 | 12/2010 | Yu | |
| 2011/0010054 A1* | 1/2011 | Wilson-Jones | B62D 5/0463 701/42 |
| 2011/0214934 A1* | 9/2011 | Ueda | B62D 5/046 180/446 |
| 2012/0004807 A1 | 1/2012 | Hales et al. | |
| 2012/0061169 A1 | 3/2012 | Oblizajek et al. | |
| 2012/0101691 A1* | 4/2012 | Otsuka | F02D 11/105 701/48 |
| 2012/0197493 A1* | 8/2012 | Fujimoto | B62D 5/0463 701/41 |
| 2013/0131926 A1 | 5/2013 | Champagne et al. | |
| 2014/0324294 A1* | 10/2014 | Champagne | B62D 5/0463 701/41 |
| 2014/0336878 A1* | 11/2014 | Yanai | G01D 5/145 701/41 |
| 2015/0224845 A1* | 8/2015 | Anderson | B60G 17/019 701/37 |
| 2016/0121923 A1* | 5/2016 | Maeda | B62D 5/0463 701/41 |
| 2017/0025973 A1* | 1/2017 | Sugiyama | H02P 27/085 |

OTHER PUBLICATIONS

Dong et al., "On a Robust Control System Design for an Electric Power Assist Steering System", 2010 American Control Conference, Jun. 30-Jul. 2, 2010, pp. 5356-5361.

Mehrabi et al., "Optimal Disturbance Rejection Control Design for Electric Power Steering Systems", 2011 50th IEEE Conference on Decision and Control and European Control Conference, Dec. 12-15, 2011, pp. 6584-6589.

* cited by examiner

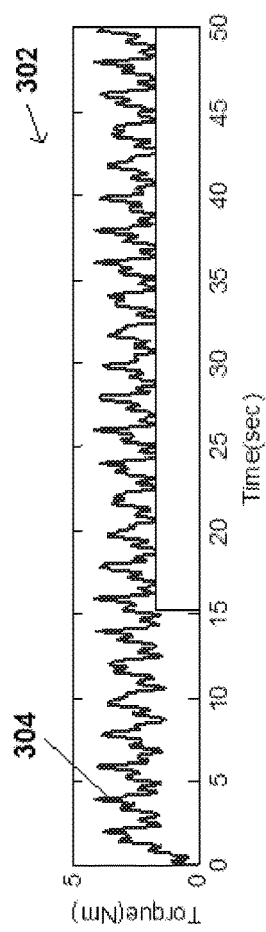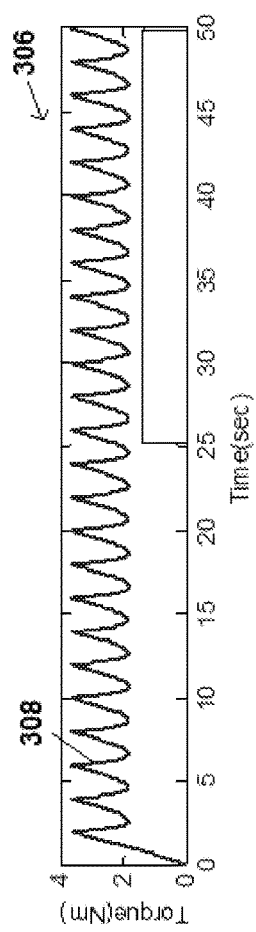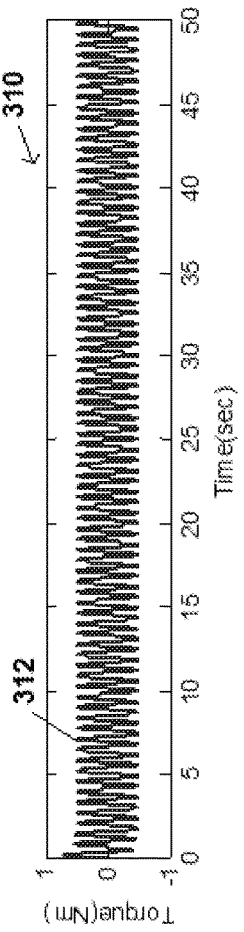

SYSTEM AND METHOD FOR ROBUST ACTIVE DISTURBANCE REJECTION IN ELECTRIC POWER STEERING

CROSS REFERENCE TO RELATED APPLICATION

This application claims priority to, and the benefit of, U.S. Provisional Application Ser. No. 62/022,694, filed Jul. 10, 2014, the full disclosure of which is incorporated herein by reference.

BACKGROUND OF THE INVENTION

This invention relates in general to vehicle power steering and in particular to a system and method for robust active disturbance rejection in an electric power steering (EPS) assembly.

The EPS assembly for a vehicle may experience an undesirable disturbance. For example, the disturbance may be a harmonic disturbance that comes from steering wheel shake or nibble. The steering wheel shake or nibble may be due to mass imbalances on steerable wheels of the vehicle or brake disc thickness variation caused by warping or bearing/caliper alignment. Known methods of providing an active disturbance rejection capability include feedforward cancellation and attenuate system gain.

Implementing the disturbance rejection via feedforward cancellation typically involves two steps: detecting the disturbance and generating a command for an actuator to counteract an effect of the disturbance. However, accurately detecting the disturbance usually requires a certain amount of transient time. Feedforward cancellation may not be applicable in scenarios such as brake pulsations where a frequency of the disturbance is both proportional to a wheel speed and changing during braking as the wheel speed changes.

The disturbance is typically detected via different types of filters. For the EPS assembly, the filter will also filter out a same frequency component present in an original torque produced by an EPS motor. This will affect steering feel and require an iterative calibration process to balance steering feel and the active disturbance rejection capability. As a result, a detected disturbance includes not only an actual disturbance but also signals from the original motor torque. Therefore, it is not possible to reject the entire actual disturbance without also rejecting the signals from the original motor torque. The disturbance rejection can be increased by high gain, but doing so will make the feedforward cancellation more unstable and sensitive to parameter uncertainties. Finally, feedforward cancellation is computationally intensive and requires significant computational resources and memory for trigonometric calculations. Feedforward cancellation also introduces complexity in analyzing performance of an implementation in terms of stability and effectiveness because the implementation is inherently a non-linear system.

The disturbance rejection is achieved via attenuating system gain within a disturbance frequency range by lowering the system gain such that energy from the disturbance is less perceivable to a driver of the vehicle as the driver manipulates a steering wheel. Attenuating system gain is a real time strategy that will respond instantaneously to the disturbance. This makes attenuating system applicable to scenarios such as brake pulsation compensation. However, attenuating system gain also cannot reject all of the disturbance, not even theoretically. Attenuating system gain also has a significant effect on steering feel and requires retuning the EPS assembly.

The disturbance is not available for direct measurement at a rack of the EPS assembly. Instead, the disturbance is indirectly measured at a steering column where gain and phase changes due to a mechanical path from the rack to the steering column also need to be compensated for. Compensating for the gain and phase changes requires a dynamic model. Often, the dynamic model itself is not obtained accurately and causes improper gain and phase compensation.

Thus, it would be desirable to reject disturbances to the EPS assembly such that baseline performance of the EPS assembly is maintained and effects due to system parameter changes are corrected by inherent feedback mechanisms.

SUMMARY OF INVENTION

This invention relates to an improved system and method for active disturbance rejection in an electric power steering assembly.

According to one embodiment, a method for active wheel disturbance rejection in an electric power steering assembly may comprise, individually and/or in combination, one or more of the following features: An electric motor is activated in response to a response signal. The response signal includes a baseline control torque signal generated by a baseline controller and an auxiliary control torque signal generated by a disturbance rejection controller. At least one operating parameter of the electric power steering assembly is estimated as a function of the baseline control torque signal. The at least one operating parameter is also measured. An error amount is determined as a function of the at least one measured operating parameter and the at least one estimated operating parameter. The disturbance rejection controller refines the at least one estimated operating parameter as a function of the error amount. The auxiliary control torque signal is generated to minimize the error amount.

According to another embodiment, a method for active wheel disturbance rejection in an electric power steering assembly may comprise, individually and/or in combination, one or more of the following features: An electric motor is activated in response to a baseline control torque signal generated by a baseline controller. At least one operating parameter of the electric power steering assembly is measured after the motor is activated. The activated motor is controlled as a function of both the baseline control torque signal and an auxiliary control torque signal generated by a disturbance rejection controller. The auxiliary control torque signal is a function of the baseline control torque and the at least one measured operating parameter. The auxiliary control torque signal is generated to minimize an error amount between the measured at least one operating parameter and an estimate of the at least one operating parameter generated by the disturbance rejection controller.

According to another embodiment, an electric power steering assembly may comprise, individually and/or in combination, one or more of the following features: A baseline controller receives a torque signal from a torque sensor and generates a baseline control torque signal. An electric motor is activated by a response signal that includes the baseline control torque signal and an auxiliary control torque signal. A disturbance rejection controller receives the baseline control torque signal. The disturbance rejection controller generates the auxiliary control torque signal as a function of the baseline control torque signal. The auxiliary control signal is generated to minimize an error amount between at least one estimated operating parameter and at least one measured operating parameter of the electric power steering system.

An advantage of an embodiment is automatic computation of a desired harmonic correction torque such that baseline performance of an electric power steering controller is maintained and effects due to system parameter changes are corrected by an inherent feedback mechanism. Other advantages of this invention will become apparent to those skilled in the art from the following detailed description of the preferred embodiments, when read in light of the accompanying drawings.

BRIEF DESCRIPTION OF DRAWINGS

FIGS. 7A-7C are graphs of a second example of the system for robust active disturbance rejection illustrated in FIG. 2.

DETAILED DESCRIPTION OF THE PREFERRED EMBODIMENTS

Figure 1:
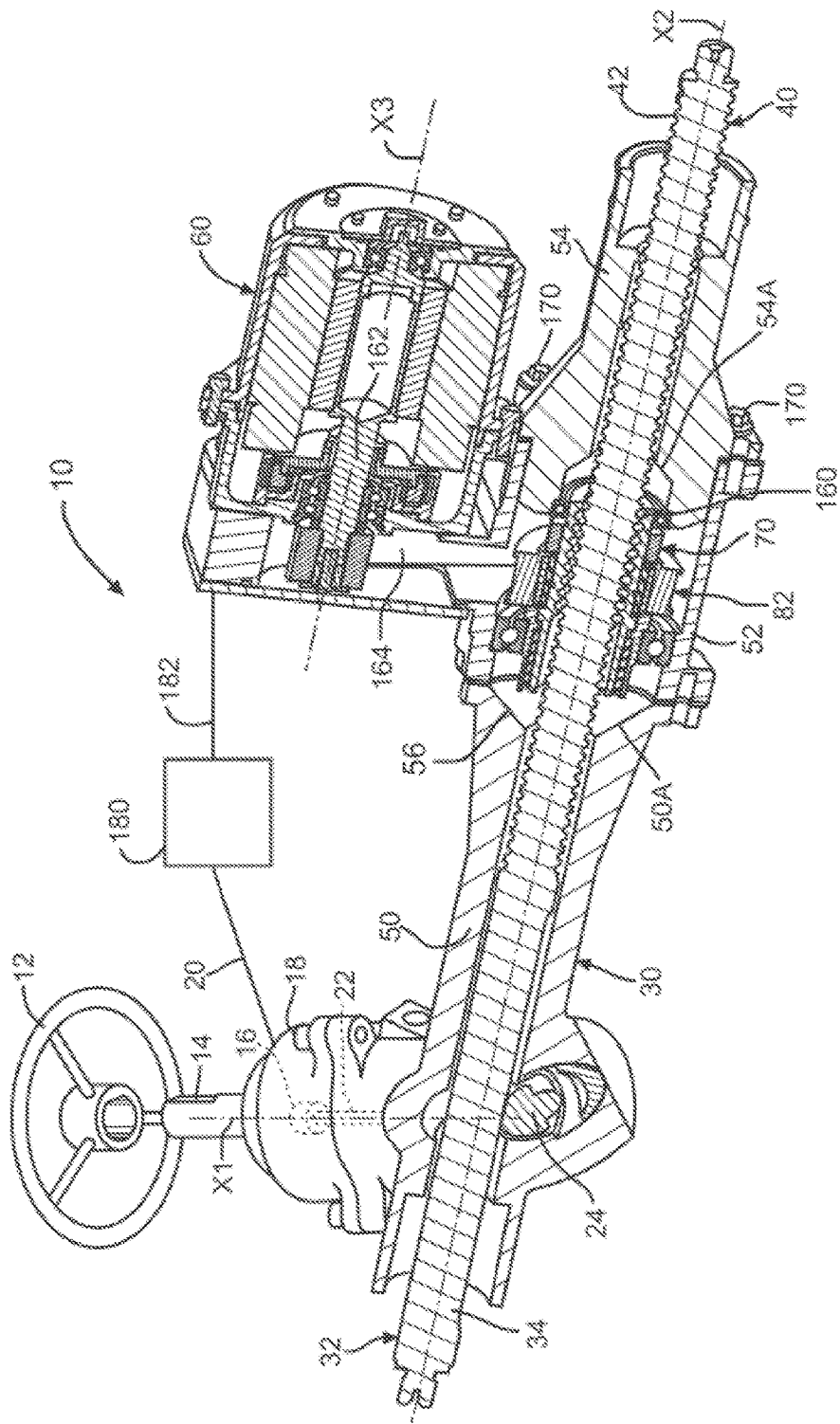
FIG. 1 is a partial sectional view of a prior art vehicle power steering assembly.

Referring now to FIG. 1, there is illustrated a portion of a prior art vehicle electric power steering (EPS) assembly, indicated generally at 10. The general structure and operation of the EPS assembly 10 is conventional in the art. Thus, only those portions of the EPS assembly 10 which are necessary for a full understanding of this invention will be explained and illustrated in detail. As illustrated in FIG. 1, the EPS assembly 10 includes a vehicle electric belt driven rack drive steering assembly and is coupled with the front driven wheels (not shown) of the vehicle. Also, although this invention will be described and illustrated in connection with the particular EPS assembly 10 disclosed herein, it will be appreciated that this invention may be used in connection with other vehicle power steering assemblies known to those skilled in the art.

The illustrated vehicle power steering assembly 10 includes a vehicle steering wheel 12 and a rotatable input shaft 14 which is operatively coupled (in a manner not shown) to the steering wheel 12 for rotation therewith about a steering axis X1. A torque sensor 16 is located inside a pinion housing 18 and encircles the input shaft 14. The torque sensor 16 includes coils (not shown) which respond to a rotation of the input shaft 14. The torque sensor 16 generates an electrical torque signal over electrical lines 20 indicative of the direction and magnitude of applied steering torque.

A torsion bar 22 is provided to connect the input shaft 14 to a pinion 24 located inside the pinion housing 18. The torsion bar 22 twists in response to the steering torque applied to the steering wheel 12. When the torsion bar 22 twists, relative rotation occurs between the input shaft 14 and the pinion 24.

The pinion housing 18 is attached to a rack housing, indicated generally at 30. A linearly movable steering member 32 extends axially through the rack housing 30. The steering member 32 is linearly (or axially) movable along a rack axis X2. A rack portion 34 of the steering member 32 is provided with a series of rack teeth (not shown) which meshingly engage gear teeth (not shown) provided on the pinion 24. The steering member 32 further includes a screw portion 40 having an external screw thread convolution 42. The steering member 32 is connected with steerable wheels (not shown) of the vehicle through tie rods (not shown) located at the distal ends of the steering member 32. Linear movement of the steering member 32 along the rack axis X2 results in steering movement of the steerable wheels in a known manner.

The rack housing 30 has a generally cylindrical configuration and includes a first section 50, a second section 52 and a third section 54. The first section 50 is connected to the second section 52 by suitable means, such as for example by a plurality of bolts and nuts (not shown). Similarly, the second section 52 is connected to the third section 54 by suitable means, such as for example by a plurality of bolts and nuts (only the bolts are shown in FIG. 1 by reference number 170). The first section 50 is provided with a radially enlarged end 50A, and the third section 54 is provided with a radially enlarged end 54A. The enlarged ends 50A and 54A of the respective first and third sections 50 and 54, respectively, cooperate with the second section 52 to define an annular chamber 56. Alternatively, as known to those skilled in the art, the structure of the rack housing 30 can be other than illustrated. For example, the rack housing 30 can include less than three sections or more than three sections if so desired.

The power steering assembly 10 further includes an electric motor 60, which is drivably connected to a ball nut assembly, indicated generally at 70. The ball nut assembly 70 effects axial movement of the steering member 32 along axis X2 upon rotation of the steering wheel 12. In the event of the inability of the electric motor 60 to effect axial movement of the steering member 32, the mechanical connection between the gear teeth on the pinion 24 and the rack teeth on the rack portion 34 of the steering member 32 permits manual steering of the vehicle. The ball nut assembly 70 is located in the chamber 56 of the rack housing 30 and encircles the screw portion 40 of the steering member 32.

The electric motor 60 is supported relative to the rack housing 30 by suitable means. The electric motor 60 includes an output shaft 162 which is connected to a member 164 for rotation therewith. For example, the member 164 may be a timing belt. The timing belt 164 is operatively connected to a pulley assembly 82. Thus, when the electric motor 60 is actuated, the timing belt 164 is rotated via the output shaft 162 so as to rotate the pulley assembly 82. The rotation of the pulley assembly 82 causes the ball nut assembly 70 to be rotated and thereby produce axial movement of the steering member 32 via balls 160.

The steering assembly 10 further includes an electronic baseline control unit or controller 180. The baseline controller 180 is preferably secured to the rack housing 30 in a manner not shown. The controller 180 is electrically connected to the electric motor 60 by electrical lines 182 and is electrically connected by the electrical lines 20 to the torque sensor 16. The controller 180 is operable to receive electrical signals from the torque sensor 16 and to control the electric motor 60 in accordance with the received electrical signals. When steering torque is applied to the vehicle steering wheel 12, the input shaft 14 rotates about the axis X1. The direction and magnitude of the applied steering torque are sensed by the torque sensor 16. The torque sensor 16 outputs the torque signal to the controller 180. The electric motor 60 is activated by a response signal $U[k]$ and the output shaft 162 of the electric motor 60 is caused to rotate about a power source axis X3. The response signal $U[k]$ includes a baseline control torque signal $U_{nom}[k]$ generated by the controller 180 as a function of the torque signal.

The rotating motor shaft 162 rotates the pulley assembly 82 via the belt 164 which in turn transmits the drive force of the electric motor 60 to the ball nut assembly 70. The rotation of the ball nut assembly 70 results in linear movement of the steering member 32. The balls 160 transmit the rotation force to the rack portion 34 of the steering member 32 along axis X2. Since the ball nut assembly 70 is axially fixed in position, the steering member 32 is driven to move axially in response to rotation of the ball nut assembly 70 to effect steering movement of the steerable wheels of the vehicle. The electric motor 60 thus provides steering assist in response to the applied steering torque.

Figure 2:
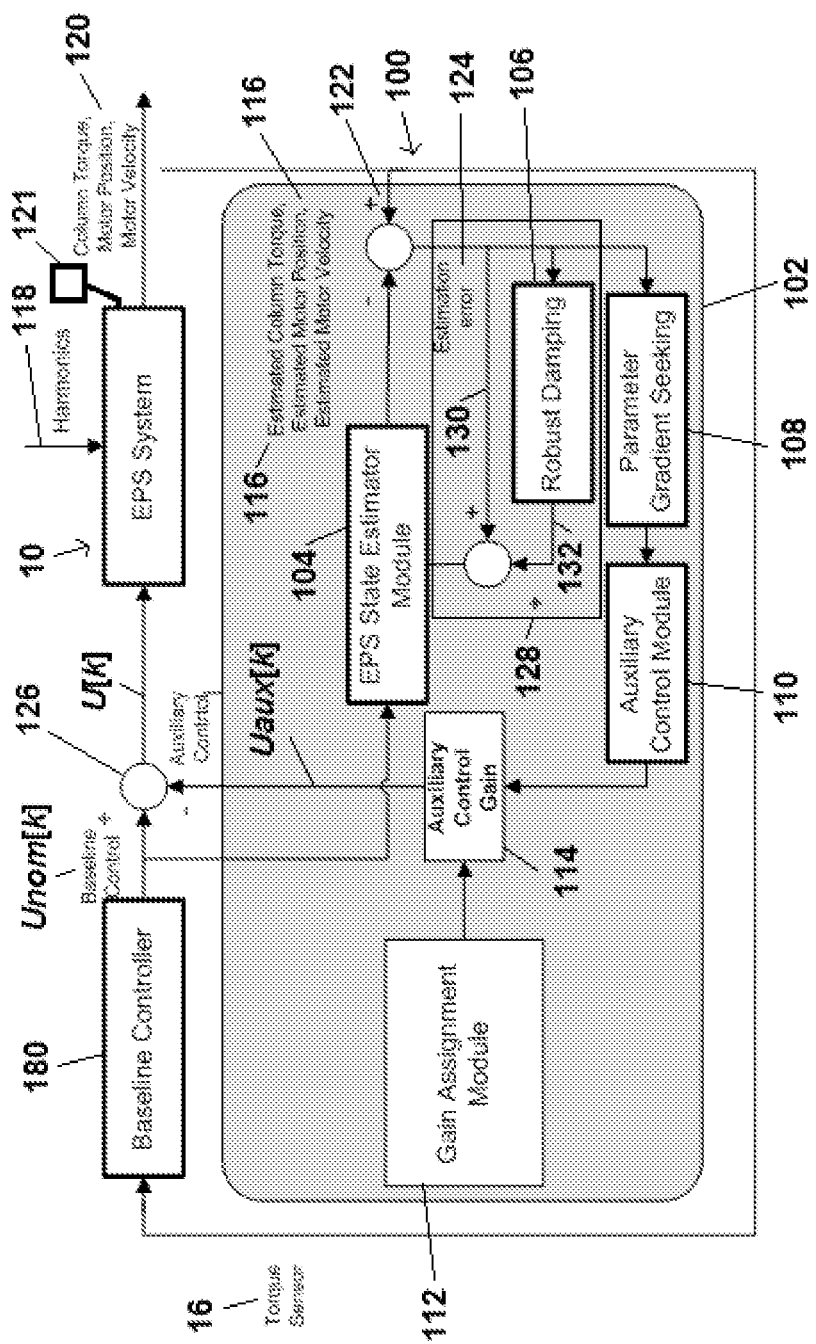
FIG. 2 is a schematic diagram of an embodiment of a system for robust active disturbance rejection in an electric power steering assembly in accordance with the present invention.
Figure 3A:
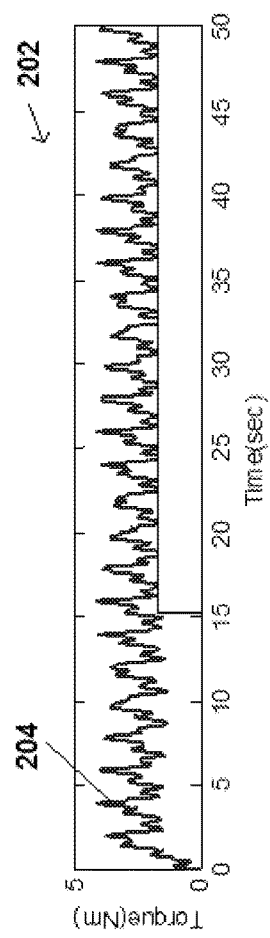
FIGS. 3A-3C are graphs of a first example of the system for robust active disturbance rejection illustrated in FIG. 2.
Figure 3B:
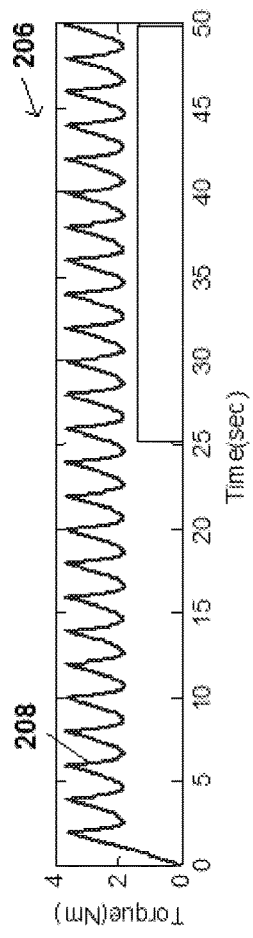
Figure 3C:
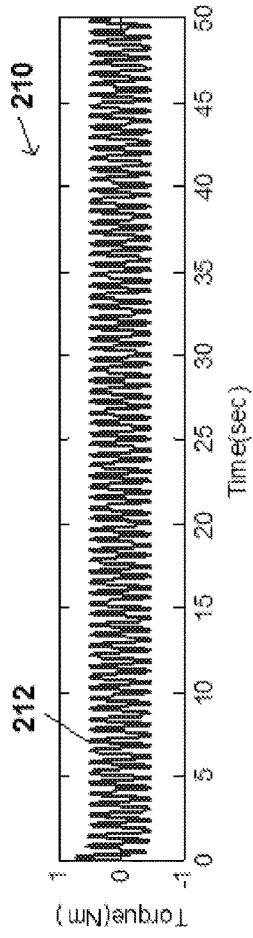
Figure 4A:
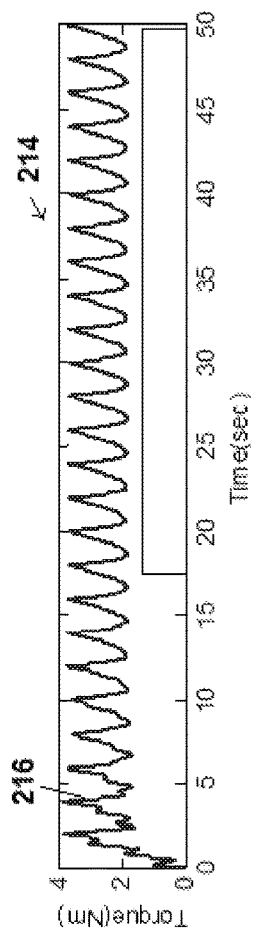
FIGS. 4A-4C are graphs of the first example of the system for robust active disturbance rejection illustrated in FIG. 2.
Figure 4B:
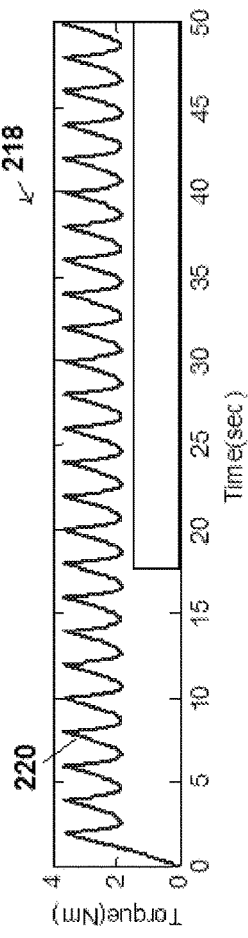
Figure 4C:
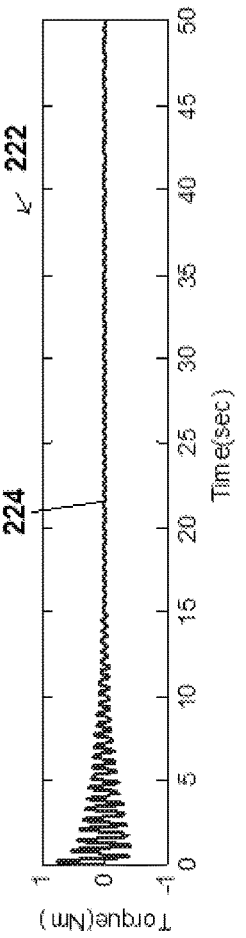
Figure 5A:
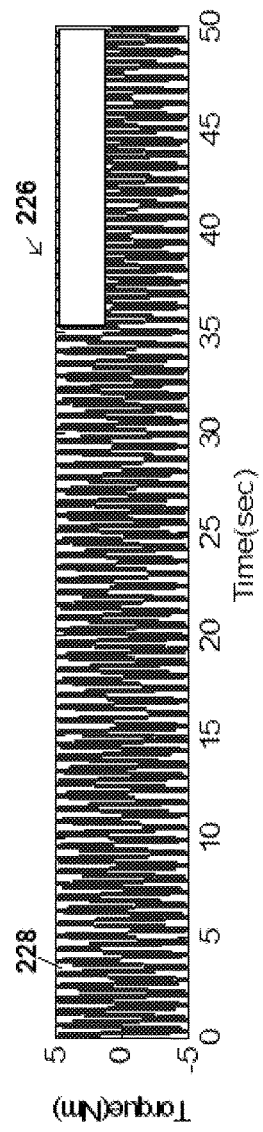
FIGS. 5A-5C are graphs of the first example of the system for robust active disturbance rejection illustrated in FIG. 2.
Figure 5B:
Figure 5C:
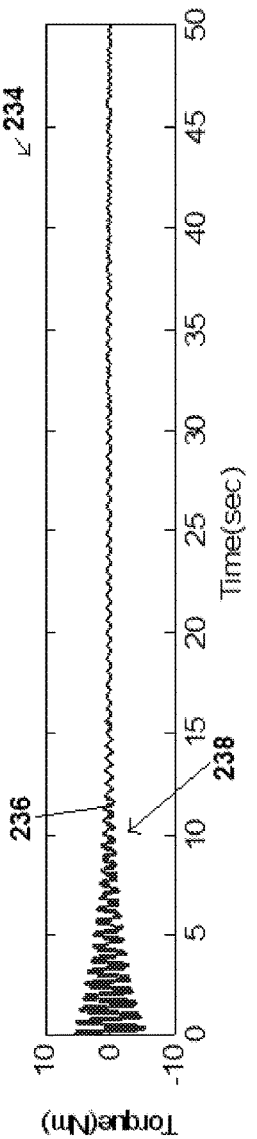
Figure 6:
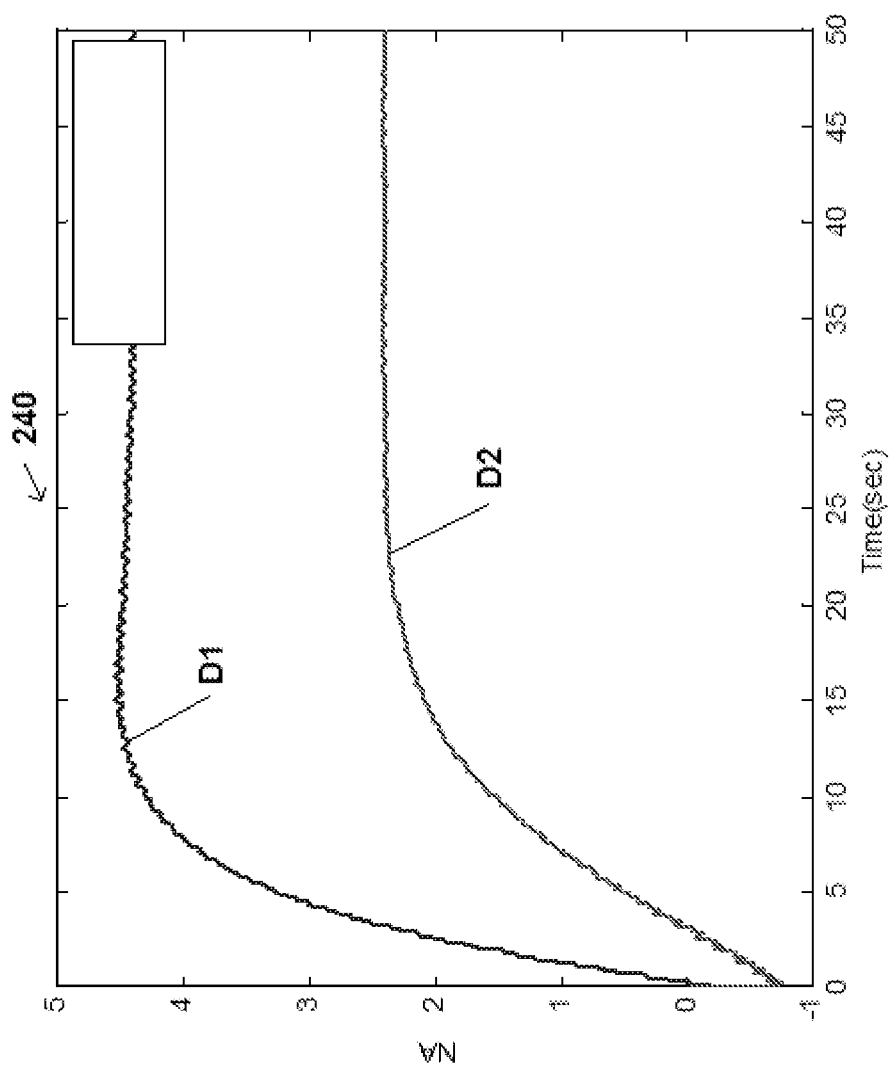
FIG. 6 is a graph of the first example of the system for robust active disturbance rejection illustrated in FIG. 2.
Figure 8A:
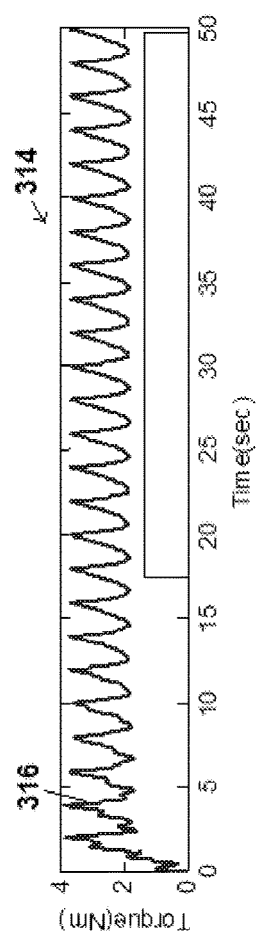
FIGS. 8A-8C are graphs of the second example of the system for robust active disturbance rejection illustrated in FIG. 2.
Figure 8B:
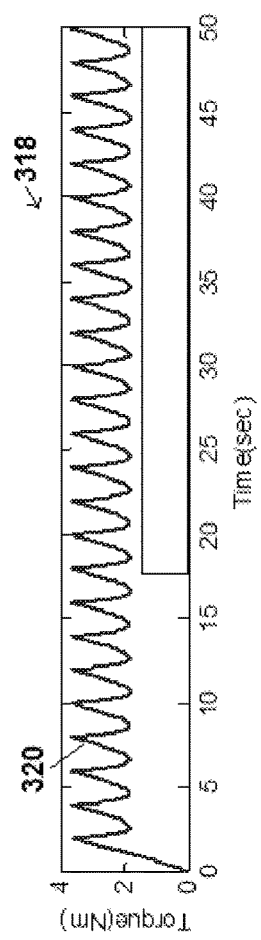
Figure 8C:
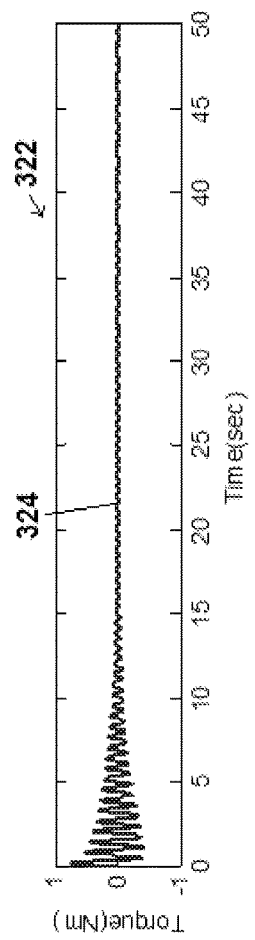
Figure 9A:
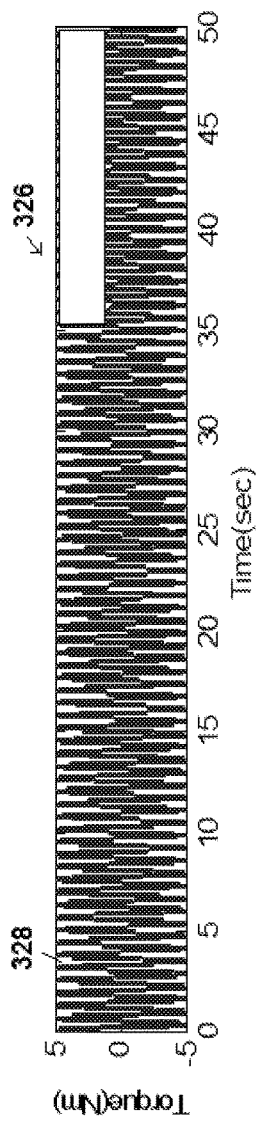
FIGS. 9A-9C are graphs of the second example of the system for robust active disturbance rejection illustrated in FIG. 2.
Figure 9B:
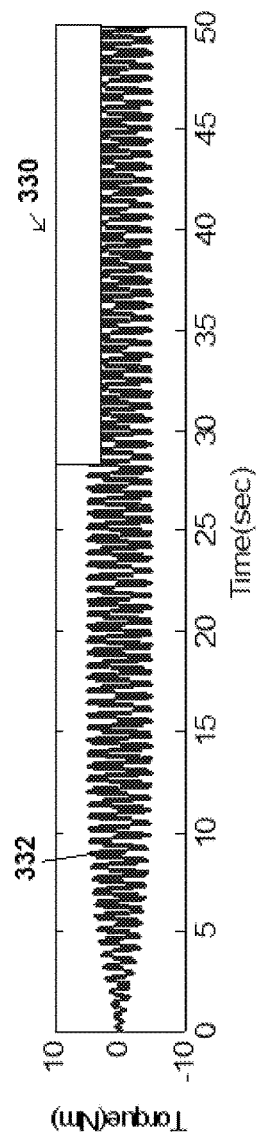
Figure 9C:
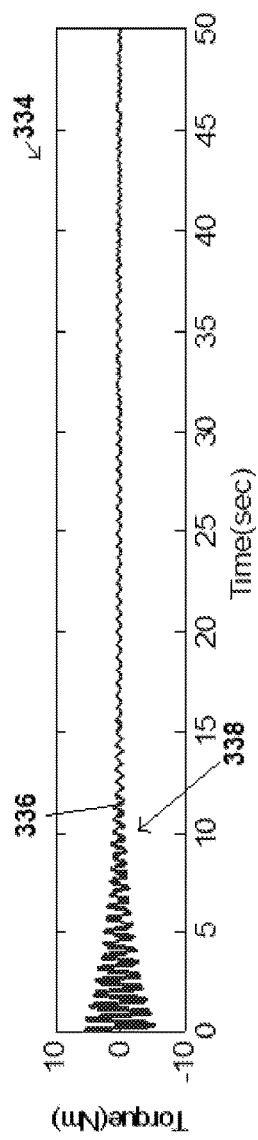
Figure 10:
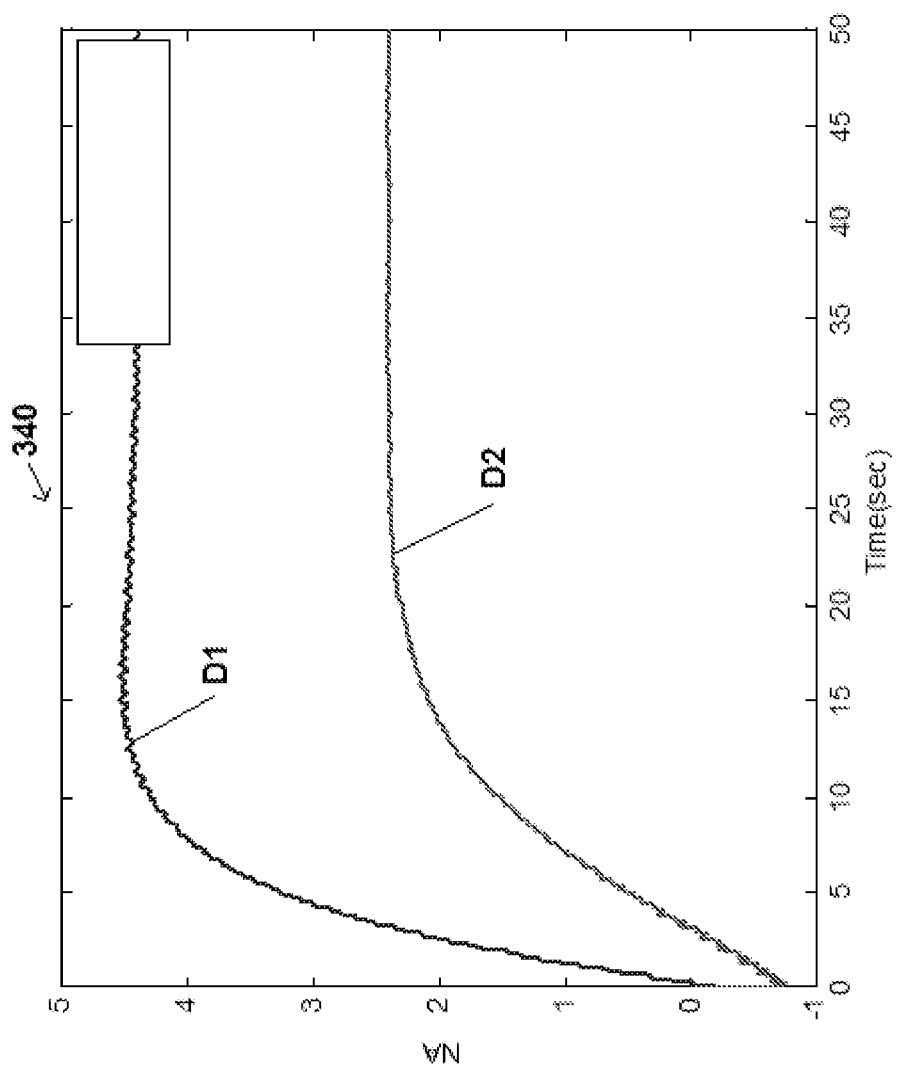
FIG. 10 is a graph of the second example of the system for robust active disturbance rejection illustrated in FIG. 2.

Referring now to FIG. 2, there is illustrated a schematic diagram of an embodiment of a system for robust active disturbance rejection, indicated generally at 100. While the disturbance rejection system 100 will be described and illustrated in conjunction with the particular prior art EPS assembly 10 disclosed herein, it will be appreciated that the disturbance rejection system 100 may be used in conjunction with other types or kinds of vehicle power steering assemblies. The disturbance rejection system 100 may be used with the prior art EPS assembly 10 without altering any baseline tuning of the prior art EPS assembly 10.

The disturbance rejection system 100 includes a disturbance rejection controller 102. The disturbance rejection controller 102 subtracts an auxiliary control torque signal $U_{aux}[k]$ from the baseline control torque signal $U_{nom}[k]$. The auxiliary control torque signal $U_{aux}[k]$ compensates for a disturbance 118 to the EPS assembly 10. The disturbance rejection controller 102 may be incorporated into the baseline controller 180 or a plug-in component separate from the controller 180. The disturbance rejection controller 102 includes an EPS state estimator module 104, a robust damping module 106, a parameter gradient seeking module 108, an auxiliary control module 110, an auxiliary control gain module 112, and a gain assignment module 114, all of which will be discussed in detail.

Dynamics of the EPS assembly 10, without a disturbance 118, is represented as follows:

$$X[k+1]=AX[k]+BU[k],  \quad\text{EQ. (1)}$$

where $X[k]$ is a measurable operating parameter of the EPS assembly 10 and $U[k]$ is the response signal to activate and control the motor 60. As a non-limiting example, the operating parameter $X[k]$ may include a position of the electric motor 60, a velocity of the electric motor 60, or a position of the input shaft 14, a rotational velocity of the input shaft 14, or torque applied to the input shaft 14. The response signal $U[k]$ is typically a commanded torque for the motor 60. EQ. (1) is a general equation and applies to all EPS assemblies, systems, and/or platforms with different configurations of components, such as for example, column drive or belt drive.

For a chosen output of the EPS assembly 10, an output equation is generally represented as follows:

$$Y[k]=CX[k]. \quad\text{EQ. (2)}$$

Typically the chosen output of the EPS assembly 10 is torque at the input shaft 14.

The disturbance 118 to the EPS assembly 10 is typically a harmonic disturbance with a frequency $N\omega$. The disturbance 118 for a single harmonic is represented as follows:

$$d[k]=D_1 \cos[N\omega kT]+D_2 \sin[N\omega kT], \quad\text{EQ. (3)}$$

where T is a sampling time, and $D_1$ and $D_2$ are coefficients of the harmonics. For a more general disturbance, a polynomial approximation may be utilized where polynomial coefficients are determined. For higher order harmonics, the disturbance 118 is represented as follows:

$$d[k]=\sum_{N=1}^{\infty}(D_{1N}\cos[N\omega kT]+D_{2N}\sin[N\omega kT]). \quad\text{EQ. (4)}$$

The disturbance equation EQ. (3) may be added to the EPS assembly dynamic equation EQ. (1), and is represented as follows:

$$X[k+1]=AX[k]+BU[k]+Bd[k]=AX[k]+B(U_{nom}[k]+U_{aux}[k])+Bd[k]. \quad\text{EQ. (5)}$$

As can be observed from EQ. (5), the response signal $U[k]$ has two components: the baseline control torque signal $U_{nom}[k]$ and the auxiliary control torque signal $U_{aux}[k]$. The baseline control torque signal $U_{nom}[k]$ is generated by the controller 180 and the auxiliary control torque signal $U_{aux}[k]$ is generated by the disturbance rejection controller 102 to offset effects of the disturbance 118. When the disturbance 118 is the harmonic disturbance, the auxiliary control torque signal $U_{aux}[k]$ is a harmonic correction torque.

The EPS state estimator module 104 constructs a nominal model of the EPS assembly 10 as a function of the baseline control torque signal $U_{nom}[k]$ and a feedback mechanism 128, which will be discussed in detail subsequently. The nominal model is used to calculate estimated parameter values 116 for the operating parameters. The estimated parameters 116 are compared, at a point 122, against actual, true measured parameter values 120 of the operating parameters. The measured parameters 120 are measured by a sensor 121. An error amount 124 is determined as a result of comparing the estimated and measured parameters 116 and 120, respectively. The error amount 124 reflects an effect of the disturbance 118 on the EPS assembly 10 because the measured parameters 120 are measured after the disturbance 118 occurs. The disturbance rejection controller 102 seeks to minimize the error amount 124.

As illustrated, the estimated and measured parameters 116 and 120, respectively, comprise torque applied to the input shaft 14, a position of the motor 60, and a velocity of the motor 60. Alternatively, the estimated and measured parameters 116 and 120, respectively, may be comprised of additional, fewer, or different parameters of the EPS assembly 10.

The EPS state estimator module 104 refines the nominal model during construction using feedback provided by the feedback mechanism 128 when constructing the nominal model. Refinement of the nominal model reduces the error amount. The feedback mechanism 128 has two components: a first feedback correction component 130 that is the error amount 124 without damping and a second component 132 that is the error amount 124 further damped via the robust damping module 106. Damping by the robust damping module 106 compensates for inaccuracy from the nominal model. The robust damping module 106 introduces a strong damping term to the nominal model. The strong damping term indicates the error amount is present. If there is a difference between the estimated parameters 116 and the measured parameters 120 due to inaccuracy in the nominal model, then the robust damping module 106 minimizes the error amount such that the EPS assembly 10 will behave as if there were no disturbance 118 despite uncertainties in the nominal model.

Construction of the model with feedback is represented as follows:

$$\hat{X}[k+1] = A\hat{X}[k] + BU_{nom}[k] + L(Y[k] - C\hat{X}[k]) + K\ sgn(Y[k] - C\hat{X}[k]),\quad \text{EQ. (6)}$$

where $\hat{X}[k]$ is the estimated parameter 116, $L(Y[k]-C\hat{X}[k])$ is the feedback correction first component 130 without damping, $K\ sgn(Y[k]-C\hat{X}[k])$ is the robust damping feedback second component 132, and $U_{nom}[k]$ is the baseline control torque signal.

The parameter gradient seeking module 108 searches for and finds a gradient of coefficients that minimizes the error amount 124. For example, as will be discussed, the gradient of coefficients may include $\hat{D}_1$ and $\hat{D}_2$ in EQ. (8). Once the gradient of coefficients is found, the auxiliary control torque signal $U_{aux}[k]$ is defined and known.

A number of optimization methods can be utilized by the parameter gradient seeking module 108 to iteratively adjust the gradient of coefficients in real time such that the error amount 124 is minimized. For the parameter gradient seeking module 108, the error amount 124 is represented as follows:

$$e[k] = X[k] - \hat{X}[k] = (A - LC)e[k] + B(U_{aux}[k] + d[k]) =\quad \text{EQ. (7)}$$
$$(A - LC)e[k] + B(U_{aux}[k] + D_1\cos(N\omega kT) + D_2\sin(N\omega kT)),$$

where e[k] is the error amount and A–LC is a stable matrix that ensures stability for error dynamics when there is no disturbance.

An auxiliary control law $U_{aux}$ can also be defined in a number of ways such that it can further minimize the error amount e[k] via gradient based seeking. This may be implemented by defining the auxiliary control torque signal $U_{aux}[k]$ as:

$$U_{aux}[k] = -\hat{D}_1\cos(N\omega K) - \hat{D}_2\sin(N\omega K)),\quad \text{EQ. (8)}$$

where $\hat{D}_1[k]$ and $\hat{D}_2[k]$ are constructed such that the error amount e[k] is minimized. An optimization method that can iteratively adjust the gradient of coefficients is represented as follows:

$$\begin{bmatrix}\hat{D}_1[k+1]\\ \hat{D}_2[k+1]\end{bmatrix} = \begin{bmatrix}\hat{D}_1[k]\\ \hat{D}_2[k]\end{bmatrix} + \begin{bmatrix}\cos(N\omega kT)\\ \sin(N\omega kT)\end{bmatrix}e^T[k]B,\quad \text{EQ. (9)}$$

where the gradient coefficients are changed iteratively to minimize the error amount.

With the gradient of coefficients found by the parameter gradient seeking module 108, the auxiliary control module 110 generates the auxiliary control torque signal as a function of the gradient of coefficients. The auxiliary control torque signal $U_{aux}[k]$ will compensate for the disturbance 118.

However, it is not always desirable that the disturbance 118 be compensated for. For example, compensation is undesirable or unsuitable when a necessary signal input to the system is not qualified for use—i.e., the necessary signal input may be a wrong value or an invalid signal—or the vehicle is running at conditions where compensation is not appreciated. The gain assignment module 112 generates a gain value, as a function of whether compensation is desirable, to either enable or disable compensation. The auxiliary control gain module 114 multiples the auxiliary control torque signal $U_{aux}[k]$ by the gain value. When compensation is not desired, the gain value is ramped down to zero by the gain assignment module 112 to effectively avoid compensation.

Lastly, the auxiliary torque control signal $U_{aux}[k]$, after multiplication by the gain value, is subtracted from the baseline control torque signal $U_{nom}[k]$ (at a point 126) to generate the response signal U[k] for the motor 60 that includes compensation for the disturbance 118.

Referring now to FIGS. 3A-6, there is illustrated a first example of a disturbance compensation using the disturbance rejection system. For the first example, the disturbance into the EPS system is represented as follows:

$$d[k] = 5\sin(10kT + 0.5).\quad \text{EQ. (10)}$$

In the first example, the nominal model produced by the EPS state estimator module is assumed to be accurate. Therefore, the nominal response has very high confidence.

A first graph, indicated generally at 202, illustrates a first plot 204 of the nominal baseline control torque signal $U_{nom}[k]$ with the disturbance and no compensation. A second graph, indicated generally at 206, illustrates a second plot 208 of the nominal baseline control torque signal $U_{nom}[k]$ without the disturbance and no compensation. A third graph, indicated generally at 210, illustrates a third plot 212 that is a difference between the first plot 204 and the second plot 208. The third plot 212 remains non-zero with time, which indicates that the disturbance remains.

A fourth graph, indicated generally at 214, illustrates a fourth plot 216 of the response single including the nominal baseline control torque signal $U_{nom}[k]$ and the auxiliary control torque signal $U_{aux}[k]$—i.e., compensation produced by the disturbance rejection system—with the disturbance. A fifth graph, indicated generally at 218, illustrates a fifth plot 220 of the nominal baseline control torque signal $U_{nom}[k]$ without the disturbance and no compensation. A sixth graph, indicated generally at 222, illustrates a sixth plot 224 that is a difference between the fourth plot 216 and the fifth plot 220. In contrast to the third graph 210, a magnitude of the sixth plot 224 decreases with time.

A seventh graph, indicated generally at 226, illustrates a seventh plot 228 of the disturbance. An eighth graph, indicated generally at 230, illustrates an eighth plot 232 of the auxiliary control torque signal $U_{auk}[k]$. A ninth graph, indicated generally at 234, illustrates a ninth plot 236 of a difference between the seventh plot 228 and the eighth plot 232. After a transient period, indicated generally at 238, the auxiliary control torque signal $U_{aux}[k]$ matches the disturbance.

A tenth graph, indicated generally at 240, illustrates a time evolution of the coefficients $D_1$ and $D_2$ by the parameter gradient seeking module—i.e., the unknown parameters found by the parameter gradient seeking module. It is readily apparent from the tenth graph 240 that the coefficients $D_1$ and $D_2$ converge to their true values.

Referring now to FIGS. 7A-10, there is illustrated a second example of a disturbance compensation using the disturbance rejection system. For the second example, the disturbance uses EQ. (10), but with system parameters (stiffness and steering system damping) perturbed by 10% from the nominal model to test robustness of the feedback mechanism.

A first graph, indicated generally at 302, illustrates a first plot 304 of the nominal baseline control torque signal $U_{nom}[k]$ with the disturbance and no compensation. A second graph, indicated generally at 306, illustrates a second plot 308 of the nominal baseline control torque signal $U_{nom}[k]$ without the disturbance and no compensation. A third graph, indicated generally at 310, illustrates a third plot 312 that is a difference between the first plot 304 and the second plot 308. The third plot 312 remains non-zero with time, which indicates that the disturbance remains.

A fourth graph, indicated generally at 314, illustrates a fourth plot 316 of the response signal including the nominal baseline control torque signal $U_{nom}[k]$ and the auxiliary control torque signal $U_{aux}[k]$—i.e., compensation produced by the disturbance rejection system—with the disturbance. A fifth graph, indicated generally at 318, illustrates a fifth plot 320 of the nominal baseline control torque signal $U_{nom}[k]$ without the disturbance and no compensation. A sixth graph, indicated generally at 322, illustrates a sixth plot 324 that is a difference between the fourth plot 316 and the fifth plot 320. In contrast to the third graph 310, a magnitude of the sixth plot 324 decreases with time.

A seventh graph, indicated generally at 326, illustrates a seventh plot 328 of the disturbance. An eighth graph, indicated generally at 330, illustrates an eighth plot 332 of the auxiliary control torque signal $U_{aux}[k]$. A ninth graph, indicated generally at 334, illustrates a ninth plot 336 of a difference between the seventh plot 328 and the eighth plot 332. After a transient period 338, the auxiliary control torque signal $U_{aux}[k]$ matches the disturbance.

A tenth graph, indicated generally at 340, illustrates a time evolution of the coefficients $D_1$ and $D_2$ by the parameter gradient seeking module—i.e., the unknown parameters found by the parameter gradient seeking module. It is readily apparent from the tenth graph 340 that the coefficients $D_1$ and $D_2$ converge to their true values.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A method for active wheel disturbance rejection in an electric power steering assembly comprising the steps of:
    activating an electric motor in response to a response signal, the response signal including a baseline control torque signal generated by a baseline controller and an auxiliary control torque signal generated by a disturbance rejection controller;
    estimating at least one operating parameter of the electric power steering assembly as a function of the baseline control torque signal;
    measuring the at least one operating parameter;
    determining an error amount as a function of the at least one measured operating parameter and the at least one estimated operating parameter, wherein the disturbance rejection controller refines the at least one estimated operating parameter as a function of the error amount; and
    generating the auxiliary control torque signal to minimize the error amount;
    wherein the at least One operating parameter includes at least one of a position of the motor or a velocity of the motor, and
    wherein the method generates the auxiliary control torque signal such that a baseline performance of the electric power steering assembly is maintained and effects thereon due to the parameter changes are corrected to minimize the error amount.

2. The method of claim 1 wherein the error amount is determined by comparing the at least one estimated operating parameter to the least one measured operating parameter.

3. The method of claim 1 wherein the at least one operating parameter is estimated using a nominal model constructed by the disturbance rejection controller.

4. The method of claim 3 wherein the at least one estimated operating parameter is refined during construction of the nominal model as a function of the error amount.

5. The method of claim 4 wherein the error amount is used without damping to refine the nominal model.

6. The method of claim 4 wherein the error amount is used with damping to refine the nominal model.

7. The method of claim 1 wherein the at least one operating parameter is measured after a disturbance affecting the power steering assembly.

8. The method of claim 7 wherein the disturbance includes a harmonic disturbance inputted to the electric power steering assembly.

9. The method of claim 1 further comprising:
    adjusting a gain of the auxiliary control torque signal to reduce the auxiliary control torque signal when conditions are unsuitable for compensation of a disturbance to the electric power steering assembly.

10. The method of claim 1 further comprising the step of:
    determining a gradient of coefficients to minimize the error amount, wherein the auxiliary control torque signal is a function of the gradient of coefficients.

11. A method for active wheel disturbance rejection in an electric power steering assembly comprising the steps of:
    activating an electric motor in response to a baseline control torque signal generated by a baseline controller;
    measuring at least one operating parameter of the electric power steering assembly after the motor is activated and after a disturbance to the electric power steering assembly;
    controlling the activated motor as a function of both the baseline control torque signal and an auxiliary control torque signal generated by a disturbance rejection controller, wherein the auxiliary control torque signal is a function of the baseline control torque and the at least one measured operating parameter, and wherein the auxiliary control torque signal is generated to minimize an error amount between the measured at least one operating parameter and an estimate of the at least one operating parameter generated by the disturbance rejection controller;
    wherein the at least one operating parameter includes at least one of a position of the motor or a velocity of the motor, and
    wherein the method generates the auxiliary control torque signal such that a baseline performance of the electric power steering assembly is maintained and effects thereon due to the parameter changes are corrected to minimize the error amount.

12. The method of claim 11 further comprising the step of: constructing a nominal model as a function of the baseline control torque signal, wherein the at least one operating parameter is estimated using the nominal model.

13. The method of claim 12 further comprising the step of: refining the nominal model to minimize the error amount.

14. The method of claim 13 wherein the error amount is not damped.

15. The method of claim 13 wherein the error amount is damped.

16. The method of claim 11 further comprising the step of: determining a gradient of coefficients to minimize the error amount, wherein the auxiliary control torque signal is a function of the gradient of coefficients.

17. The method of claim 11 further comprising the step of: ramping a gain value to zero to avoid compensation for a disturbance to the electric power steering assembly; multiplying the auxiliary control torque signal by the gain value.

18. An electric power steering assembly comprising:
an electric motor;
a baseline controller receiving a torque signal from a torque sensor and generating a. baseline control torque signal, wherein the motor is activated by a response signal including the baseline control torque signal and an auxiliary control torque signal;
a disturbance rejection controller receiving the baseline control torque signal, wherein the disturbance rejection controller generates the auxiliary control torque signal as a function of the baseline control torque signal, wherein the auxiliary control torque signal is generated to minimize an error amount between at least one estimated operating parameter and at least one measured operating parameter of the electric power steering system;
wherein the at least one operating parameter includes at least one of a position of the motor or a velocity of the motor; and
wherein the auxiliary control torque signal is generated such that a baseline performance of the electric power steering assembly is maintained and effects thereon due to the parameter changes are corrected to minimize the error amount.

19. The electric power steering assembly of claim 18 further comprising:

an electric power steering state estimator module constructing a nominal model as a function of the baseline control torque signal, wherein the nominal model generates the at least one estimated operating parameter.

20. The electric power steering assembly of claim 19 wherein the error amount is used to refine the nominal model.

21. The electric power steering assembly of claim 20 wherein the error amount is not damped.

22. The electric power steering assembly of claim 20 wherein the error amount is damped.

23. The electric power steering assembly of claim 19 further comprising:
a feedback mechanism generating the error amount that is provided as feedback to the state estimator module.

24. The electric power steering assembly of claim 18 further comprising:
an auxiliary control module generating the auxiliary control torque signal.

25. The electric power steering assembly of claim 24 further comprising:
a parameter gradient seeking module determining a gradient of coefficients to minimize the error amount, wherein the auxiliary control module generates the auxiliary control torque signal as a function of the gradient of coefficients.

26. The electric power steering assembly of claim 18 further comprising:
a gain assignment module generating a gain for the auxiliary control torque signal when conditions are unsuitable for compensation of a disturbance to the electric power steering assembly; and
an auxiliary control gain module adjusting the auxiliary control torque signal as a function of the gain generated by the gain assignment module.

27. The electric power steering assembly of claim 18 further comprising:
a steering member disposed in a rack housing, wherein the steering member has a rack portion operatively connected to a vehicle steering wheel and a screw portion;
a ball nut assembly operatively connected to the screw portion for effecting axial movement of the steering member upon rotation of the vehicle steering wheel;
a pulley assembly coupling the rotor shaft and the electric motor.

* * * * *